(No Model.)

J. T. BARKER.
DENTAL INSTRUMENT.

No. 571,965. Patented Nov. 24, 1896.

Witnesses
Harry Newshafer.
Andrew Ferguson

Inventor
John T. Barker
By W. E. Simonds,
Attorney

UNITED STATES PATENT OFFICE.

JOHN T. BARKER, OF WALLINGFORD, CONNECTICUT.

DENTAL INSTRUMENT.

SPECIFICATION forming part of Letters Patent No. 571,965, dated November 24, 1896.

Application filed April 20, 1896. Serial No. 588,358. (No model.)

*To all whom it may concern:*

Be it known that I, JOHN T. BARKER, a citizen of the United States of America, residing at Wallingford, in the county of New Haven and State of Connecticut, have invented a certain new and useful Improvement in Dental Instruments, of which the following is a description, reference being had to the accompanying drawings, wherein—

Figure 1:
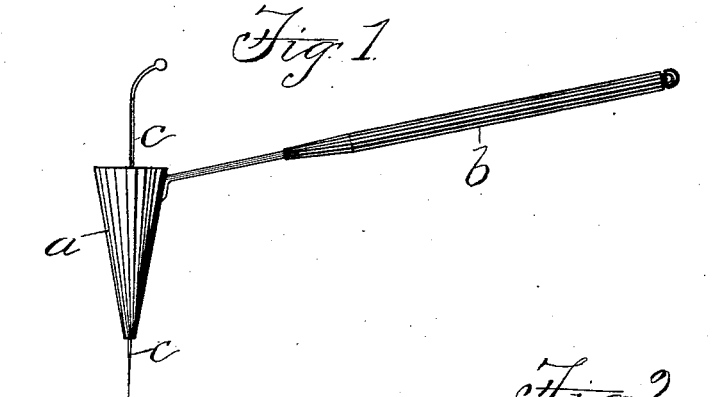
Figure 2:
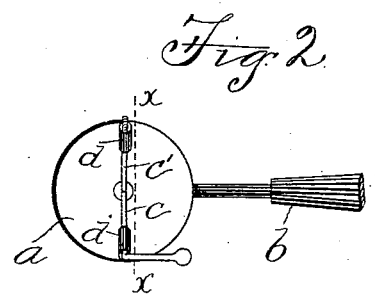
Figure 3:
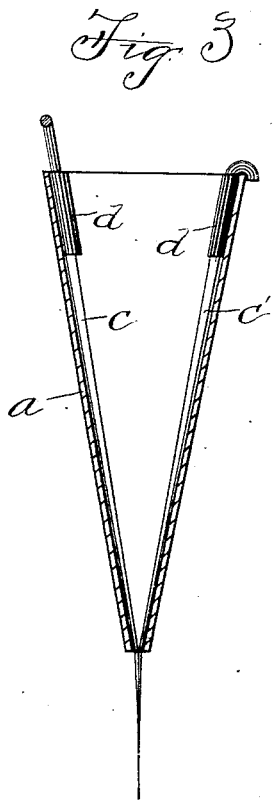

Figure 1 is a side view of an instrument embodying said improvement on an enlarged scale. Fig. 2 is an end view of the larger end of the tapering vessel, forming a part of the instrument. Fig. 3 is a view in section of said tapering vessel on the plane indicated by the dotted line $x\,x$ of Fig. 2, looking in the direction indicated by the arrow overlying that dotted line.

The object of the improvement is the pro20 duction of an instrument specially applicable in treating the root-canals of teeth, for instance, introducing therein a liquid for some specific purpose.

In the accompanying drawings, the letter $a$ denotes a vessel quite small at one end—smaller than at the other end—wherefore it may appropriately be called a "tapering" vessel. This smaller end is open for the passage of a probe or probes and also for the passage of a liquid used in treatment.

The vessel is provided with a suitable handle $b$.

The letter $c$ denotes a probe, and $d$ a guide or holder for such probe. For using the instrument in the treatment of a tooth upon the lower jaw, and for some purposes, a single probe suffices. The liquid used in the treatment is held in the vessel, the probe is inserted in the root-canal, and the liquid finds its way to the desired spot along the probe.

The letter $c'$ denotes another similar probe, also provided with a guide or holder $d$. These two probes are used together for the purpose of affording a surface along which the liquid will travel toward the point of the probes under the influence of capillary attraction. The union of the two probes is especially useful in treating teeth upon the upper jaw.

I claim as my improvement—

1. The herein-described dental instrument for treating root-canals of teeth, comprising the tapering vessel $a$, open at the smaller end, a probe $c$, and a guide or director $d$, for the said probe, affixed to one side of the interior wall of the tapering vessel, whereby fluid medicaments may be directed to the point of treatment in tooth-cavities, substantially as and for the purpose specified.

2. In combination, the tapering vessel $a$ open at the smaller end, the probes $c\,c'$ and the guides or holders $d\,d$, all substantially as described and for the purposes set forth.

JOHN T. BARKER.

Witnesses:
F. A. IVES,
JOHN A. MARTIN.